United States Patent [19]

DeVries

[11] Patent Number: 4,612,543

[45] Date of Patent: Sep. 16, 1986

[54] INTEGRATED HIGH-GAIN ACTIVE RADAR AUGMENTOR

[75] Inventor: James M. DeVries, Camarillo, Calif.

[73] Assignee: The United States of America as represented by the Secretary of the Navy, Washington, D.C.

[21] Appl. No.: 491,686

[22] Filed: May 5, 1983

[51] Int. Cl.⁴ .......................................... G01S 13/74
[52] U.S. Cl. .................................................. 343/5 R
[58] Field of Search ................. 343/6.8 R, 5 R, 18 E, 343/856, 867, 872, 874, 875, 890, 700 MS, 18 B, 18 C, 16 M, 841, 885, 705; 455/7, 11

[56] References Cited

U.S. PATENT DOCUMENTS

| | | | |
|---|---|---|---|
| 2,717,312 | 9/1955 | Taylor | 343/18 A |
| 3,039,089 | 6/1962 | McMurtrey, Jr. | 343/6.8 R |
| 3,185,986 | 5/1965 | McCaughna et al. | 343/18 E |
| 3,681,770 | 8/1972 | Alford | 343/841 |
| 3,699,574 | 10/1972 | O'Hara et al. | 343/16 M |
| 3,972,050 | 7/1976 | Kaloi | 343/853 |
| 4,050,073 | 9/1977 | Wesch | 343/18 A |

FOREIGN PATENT DOCUMENTS 2524684 12/1976 Fed. Rep. of Germany .... 343/18 B

OTHER PUBLICATIONS

*Radar Handbook*, by M. I. Skolniki, pp. 8–15; McGraw-Hill, N.Y., 1970.
Nasa Tech Brief 67-10675 Dec. 1967.
"Conformal Microstrip Antennas and Microstrip Phased Arrays", by R. Munsoni IEEE Transactions on Antennas and Propogation (1/74), p. 74.

*Primary Examiner*—Thomas H. Tarcza
*Assistant Examiner*—Bernarr Earl Gregory
*Attorney, Agent, or Firm*—Robert F. Beers; J. M. St. Amand

[57] ABSTRACT

A compact and integrated high-gain radar augmented system, including: a cylindrical microstrip receive antenna mounted on a cylinder for providing nominal omni-directional coverage, a transmit antenna similar to the receive antenna mounted on the same cylinder, isolating radio-frequency (RF) absorbing means located between the two antennas, and a high-gain amplifier located within the body of the cylinder and connected to the two antennas. The entire assembly can be covered by an RF radome for component protection.

16 Claims, 5 Drawing Figures

4,612,543

INTEGRATED HIGH-GAIN ACTIVE RADAR AUGMENTOR

BACKGROUND OF THE INVENTION

The present invention relates to radar augmentors (transponders) that enhance a target size as viewed from the radar, by radar signal reception, amplification and transmission, and particularly to provide such capability in a compact single-unit device. In even greater particularity, the present invention relates to very compact, high-gain active radar augmentors that are very easy to deploy and maintain.

The use of active radar augmentors is well known and the implementation of such devices is widespread. Radar augmentors have assumed many different shapes and configurations in the past. Active radar augmentors that are required to provide omni-directional coverage, however, have proved especially difficult to implement due to the poor isolation between receive and transmit antennas. To achieve the required isolation, the antennas have been forced to be widely separated. This separation results in a distributed system with at least three parts: the receive antenna, the radio-frequency (RF) amplifier, and the transmit antenna, which are connected by cables or waveguide.

Widely distributed systems, as presently configured, result in expensive installations with multiple interconnection points resulting in premature failure and resultant repair. Distributed active augmentors operating in harsh climates are especially prone to early failure, such as those seen on ocean-going vessels.

SUMMARY OF THE INVENTION

It is therefore an object of the present invention to provide a new concept in very compact, high-gain active radar augmentors that are easy to deploy and maintain.

A further object of the present invention is to provide such a radar augmentor having application to enhance radar visibility for sea, surface or air vehicles, or targets.

Another object of the present invention is to provide a single, stand-alone, high-gain active radar augmentor for simultaneous transmission and reception, having improved reliability, maintainability, and reduced installation burden.

Still another object of the present invention is to provide a unified transponder for private or commercial aircraft.

Accordingly, to accomplish these and other objects, the present invention provides, in an integrated system, a cylindrical microstrip receive antenna mounted on a cylinder for providing nominal omni-directional coverage, a transmit antenna similar to the receive antenna mounted on the same cylinder, radio-frequency (RF) absorbing means located between the two antennas, and a high-gain amplifier located within the body of the cylinder and connected to the two antennas. The entire assembly is then covered by an RF radome for component protection, when needed.

DESCRIPTION OF THE PREFERRED EMBODIMENT

Figure 1:
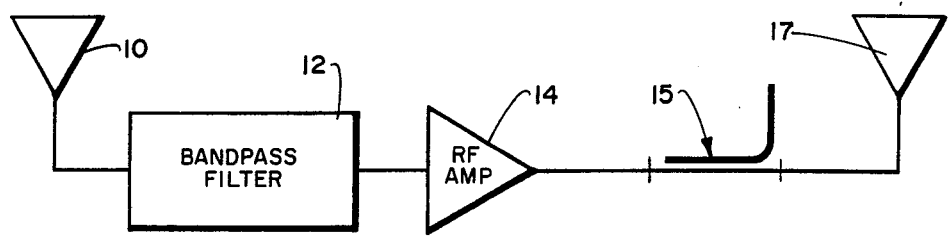
FIG. 1 is a signal flow block diagram of the system.

The signal flow diagram of the invention is shown in FIG. 1 where an omni-directional antenna 10 receives a radar signal and a bandpass filter 12 selects the band of frequency to be processed. A high-gain RF amplifier 14 amplifies the desired signal band and a directional coupler 15 monitors the augmentor output. A transmit antenna 17 returns the amplified signal omni-directionally. Directional coupler 15 allows a detector to be added to the circuit to measure the amount of power being re-radiated via the transmit antenna 17. However, coupler 15 is not required for the operation of the augmentor system. The isolation between antennas 10 and 17 is critical and is required to be greater than the amplifier gain to prevent oscillation. In the drawings, like reference characters designate like or corresponding elements throughout the various illustrations.

Figure 2:
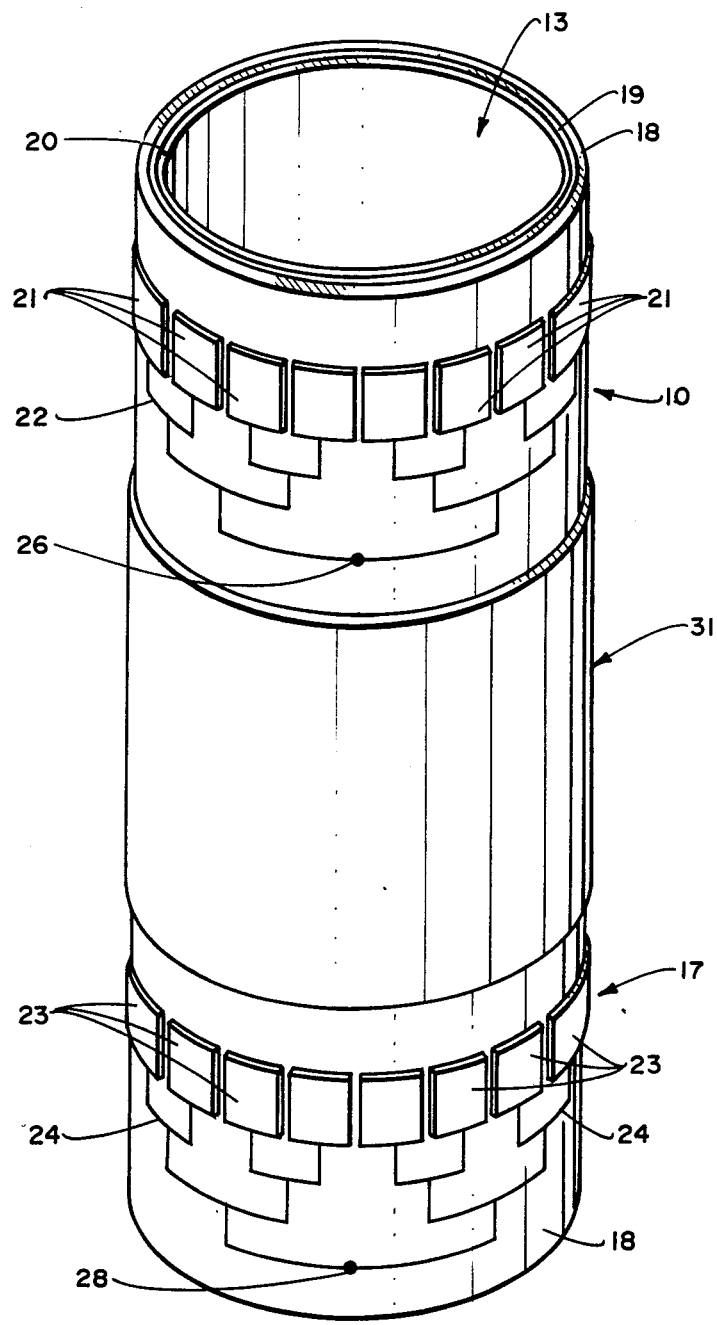
FIG. 2 shows a typical arrangement and location for the transmit antenna, the receive antenna, and the RF absorbing material about the mounting cylinder according to the present invention.
Figure 3:
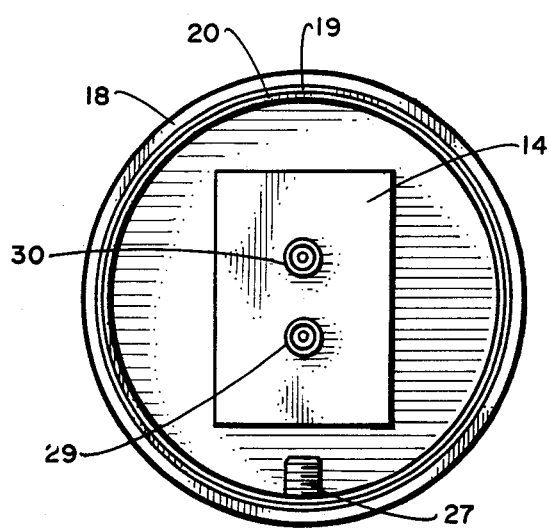
FIG. 3 is a top view of the arrangement shown in FIG. 2.

Microstrip antennas are used in the preferred embodiment to provide nominal omni-directional coverage for the receive antenna 10 and transmit antenna 17. Typically, a microstrip antenna array, as shown in U.S. Pat. No. 3,972,050 having radiating elements mounted on a dielectric substrate 18 above a ground plane 19, is formed in a cylindrical shape to provide an omni-directional pattern. A separate microstrip antenna array is used for each of the antennas 10 and 17. FIG. 2 shows the location of the two antennas or arrays (receive antenna 10 and transmit antenna 17) mounted on a metallic (e.g. aluminum) cylinder 20. The choice of location for the receive or transmit antenna, as being either above or below the other, is arbitrary. Radiating elements 21 with their necessary connecting feed network 22 formed on a dielectric substrate 18 over a ground plane 19 comprise receive antenna 10, and radiating elements 23 with their necessary connecting feed network 24 also formed on a dielectric substrate 18 over a ground plane 19 comprise transmit antenna 17. The single feed driving point 26 of antenna 10 is fed from the interior of cylinder 20, via coaxial feed 27, such as shown in FIG. 3. The transmit antenna 17 is also fed from a similar coaxial feed, not shown, from the interior of cylinder 20 to a single feed driving point 28, and in general is identical to the upper antenna 10. The interior of cylinder 20 is available for the placement of filter 12, RF amplifier 14 and other devices. Coaxial feed 27 connected to feed point 26 and the coaxial feed connected to feedpoint 28 are in turn connected via coaxial cables, not shown, to the coaxial connectors 29 and 30, respectively, of RF amplifier and power supply 14 at the interior of cylinder 20, as shown in FIG. 3.

The use of a single metallic cylinder 20 is preferred since it provides an extended or continuous ground plane beneath both the receive microstrip antenna 10 and transmit microstrip antenna 17, and in turn provides higher isolation between the two antennas by preventing diffraction which normally would occur between the edges of separate ground planes for individual microstrip antennas mounted separately in the augmentor assembly. Where there is sufficient isolation between the antennas or where other type antennas are used cylinder 20 could be non-metallic.

RF absorbing material 31 (such as polyurethane foam or silicon rubber loaded with carbon or ferrite particles) operates to absorb incident microwave energy when placed around cylinder 20, as shown in FIG. 3 to increase the isolation between the two antennas 10 and 17. Isolation is achieved by axially orienting the cylindrical antennas on a metallic cylinder with the strategic placement of the RF absorbing material on the cylinder between the two antennas. Isolation should be greater than 60 decibels for most high-gain active augmentors.

The cylindrical antennas, as viewed axially from the top, are shown in FIG. 3. The cylinder 20, as shown, contains the RF amplifier 14 and the placement of the two coaxial connectors 29 and 30 for RF input and output of the amplifier. The RF cables connecting the amplifier are not shown. By way of example, the cylinder diameter can be 3.5 inches for operation at 9.0 GHz; with the length of the cylinder being 12 inches, just long enough to house the amplifier and associated equipment and to support the antennas. Typical microstrip antenna arrays for receive antenna 10 and transmit antenna 17, for example, comprise sixteen radiating elements 21 or 23, arranged and connected with feed networks as shown in FIG. 2. The radiating elements are each approximately 0.35 inch in length by 0.6 inch in width and spaced approximately 0.031 inch above the ground plane by a substrate material having a dielectric constant of about 2.2. Spacing between the two antennas should be approximately 10 inches, for example. The RF absorbing material 31 which operates to increase the isolation between the receive and transmit antennas typically would be about 8 inches wide and 1 inch thick, for example, wrapped completely around cylinder 20 to provide approximately 20 decibels attenuation to incident signals. A lightweight foam broad-band microwave absorber, or high-loss silicone rubber dielectric, for example, can be used to provide required RF energy absorption.

Figure 4:
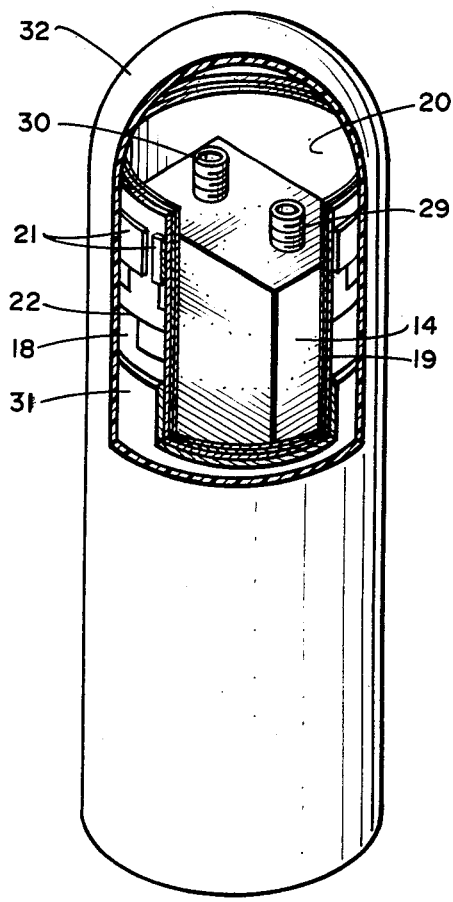
FIG. 4 shows a break-away assembled view of the augmentor of FIGS. 2 and 3 showing a protective radome in place over the arrangement.

An assembled view of the radar augmentor is shown as FIG. 4. A radome 32 of epoxy and fiberglass, for example, is shown in place over the cylinder. The radome can be deleted provided the antennas, absorber, amplifier and associated equipment can otherwise be protected from the environment. Cylinder 20 containing the antennas and RF absorber is shown with the RF amplifier 14 inside.

Figure 5:
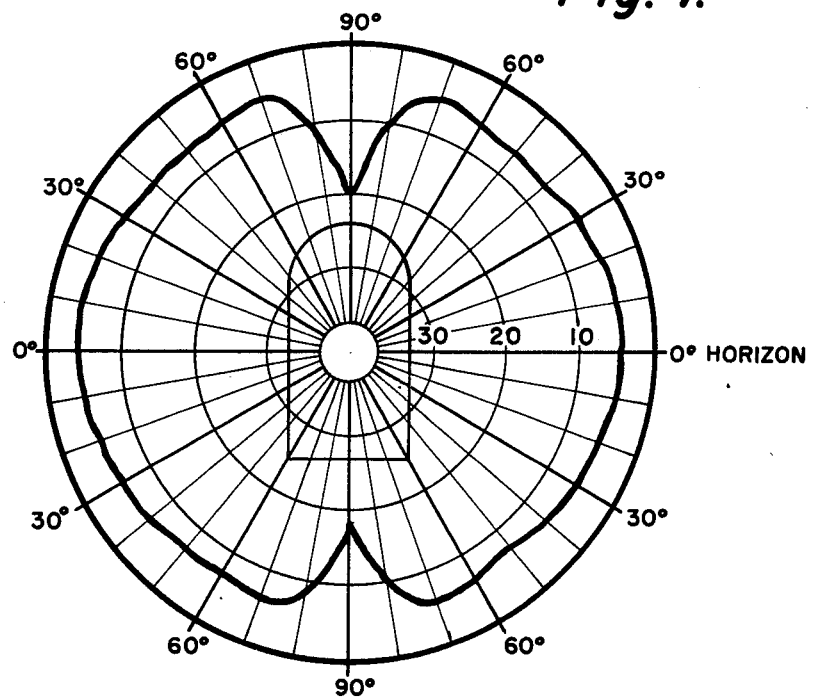
FIG. 5 illustrates a typical radiation pattern in the elevation plane, for a device of the present invention.

A typical radiation pattern, in the elevation plane, is shown in FIG. 5. The augmentor coverage decreases in the axial direction to produce a null at 90 degrees. Coverage in the azimuth direction at a given elevation angle is constant for any given azimuthal angle.

The cylindrical antennas are not limited to the use of the microstrip antenna. Any suitable omni-directional cylindrical antenna with an interior cavity can be used. Also, a microstrip antenna using any suitable number of radiating elements, depending upon the diameter of the cylinder 20, can be used. The use of a radome is optional, its only purpose being to protect the antennas and microwave absorber if they are not treated individually to protect them from the environment.

This device overcomes the disadvantages of a distributed system, as well as other disadvantages, by providing an augmentor that is contained in one compact integrated unit which can be mounted easily on ocean-going vessels, surface vehicles, or aircraft. The antennas and RF absorber are cylindrical in shape providing omni-directional coverage and isolation between antennas with an inner cavity in which the RF amplifier and other related equipment can be housed. The device can readily be mounted within a fiberglass mast of a small sea craft or as a transponder on an aircraft.

Obviously many modifications and variation of the present invention are possible in light of the above teachings. It is therefore to be understood that within the scope of the appended claims the invention may be practiced otherwise than as specifically described.

What is claimed is:

1. An integrated and compact high-gain active radar augmentor for enhancing radar visibility, comprising:
   a. An omni-directional receive antenna;
   b. an omni-directional transmit antenna;
   c. said omni-directional receive antenna and said omni-directional transmit antenna being axially oriented and integrally mounted about a metallic cylinder;
   d. a cylindrical RF absorbing means having an inside diameter equal to the outside diameter of said metallic cylinder and being mounted on said metallic cylinder between said omni-directional receive antenna and said omni-directional transmit antenna for isolating said receive antenna from said transmit antenna such that required isolation between the two antennas is achieved by the strategic placement of said RF absorbing means between the two antennas;
   e. a filter means housed within said metallic cylinder and connected to said receive antenna for selecting the band of input frequency to be processed;
   f. a high-gain RF amplifier housed within said metallic cylinder and connected to the output of said filter means for amplifying the selected signal frequency band;
   g. the isolation between said receive antenna and said transmit antenna being greater than the gain of said RF amplifier;
   h. said transmit antenna being connected to the output of said Rf amplifier for re-radiating the amplified selected band of input frequency omni-directionally;
   i. a directional coupler provided between said RF amplifier and said transmit antenna for allowing measurement of the amount of power being re-radiated via said transmit antenna;
   j. said omni-directional receive antenna, said RF absorbing means, and said omni-directional transmit antenna being cylindrical in shape and connected to said filter means, said RF amplifier and related equipment which powers the augmentor which are housed within the metallic cylinder;
   whereby simultaneous reception, amplification and retransmission of select radar signals is provided that enhance the radar visibility.

2. An active radar augmentor as in claim 1 wherein said receive antenna and said transmit antenna are each microstrip antennas cylindrically shaped to provide omni-directional coverage.

3. An active radar augmentor as in claim 2 wherein said cylinder is metallic and operates to provide a continuous ground plane beneath both the receive microstrip antenna and the transmit microstrip antenna for providing a higher isolation between the receive and transmit antennas by preventing diffraction which otherwise would occur between the two microstrip antennas.

4. An active radar augmentor as in claim 2 wherein said receive antenna and said transmit antenna are each microstrip antenna arrays of radiating elements including feed networks.

5. An active radar augmentor as in claim 1 wherein said RF absorbing means comprises a dielectric material loaded with carbon particles which operates to absorb incident microwave energy.

6. An active radar augmentor as in claim 5 wherein said dielectric material is polyurethane foam.

7. An active radar augmentor as in claim 5 wherein said dielectric material is a solid high-loss silicone rubber.

8. An active radar augmentor as in claim 1 wherein isolation between said receive antenna and said transmit antenna is greater than 60 decibels.

9. An active radar augmentor as in claim 1 wherein said RF absorbing means provides at least 20 decibels attenuation to incident signals.

10. An active radar augmentor as in claim 1 housed within the mast of a sea craft.

11. An active radar augmentor as in claim 1 wherein a radome is provided for protection of the components from the elements.

12. An active radar augmentor as in claim 1 wherein said RF absorbing means comprises a dielectric material loaded with ferrite particles which operates to absorb incident microwave energy.

13. An integrated and compact high-gain active radar augmentor for enhancing radar visibility, comprising:
   a. An omni-directional receive microstrip antenna;
   b. an omni-directional transmit microstrip antenna;
   c. said omni-directional receive antenna and said omni-directional transmit antenna being axially oriented and integrally mounted about a single RF conducting metallic cylinder;
   d. a cylindrical RF absorbing means having an inside diameter equal to the outside diameter of said metallic cylinder and being mounted on said metallic cylinder between said omni-directional receive antenna and said omni-directional transmit antenna for isolating said receive antenna from said transmit antenna such that required isolation between the two antennas is achieved by the strategic placement of said RF absorbing means between the two antennas;
   e. a filter means housed within said metallic cylinder and connected to said receive antenna for selecting the band of input frequency to be processed;
   f. a high-gain RF amplifier housed within said metallic cylinder and connected to the output of said filter means for amplifying the selected signal frequency band;
   g. the isolation between said receive antenna and said transmit antenna being greater than the gain of said RF amplifier;
   h. said transmit antenna being connected to the output of said RF amplifier for re-radiating the amplified selected band of input frequency omni-directionally;
   i. said single RF conducting metallic cylinder on which said receive antenna, said RF absorbing means and said transmit antenna are axially mounted providing a continuous ground plane beneath both the omni-directional receive microstrip antenna and the omni-directional transmit microstrip antenna which produces a higher isolation between the receive and transmit antennas by preventing diffraction which otherwise would occur between the two microstrip antennas when mounted on separate ground planes;
   whereby simultaneous reception, amplification and retransmission of select radar signals is provided that enhance the radar visibility.

14. An integrated and compact high-gain active radar augmentor for enhancing radar visibility, comprising:
   a. An omni-directional receive antenna;
   b. an omni-directional transmit antenna;
   c. an RF absorbing means for isolating said receive antenna from said transmit antenna;
   d. said receive antenna and said transmit antenna being integrally mounted on either side of said RF absorbing means such that required isolation between the two antennas is achieved by the strategic placement of said RF absorbing means between the two antennas;
   e. a filter means connected to said receive antenna for selecting the band of input frequency to be processed;
   f. a high-gain RF amplifier connected to the output of said filter means for amplifying the selected signal frequency band;
   g. the isolation between said receive antenna and said transmit antenna being greater than the gain of said RF amplifier;
   h. said transmit antenna being connected to the output of said RF amplifier for re-radiating the amplified selected band of input frequency omni-directionally, and means provided for measuring the power re-radiated by said transmit antenna;
   i. said receive antenna, said RF absorbing means, and said transmit antenna being axially mounted on and about and forming a portion of an RF conducting housing which encloses said filter means, said RF amplifier and related equipment; said RF conducting housing also operating to provide isolation between the two antenna;
   whereby simultaneous reception, amplification and retransmission of select radar signals is provided that enhance the radar visibility.

15. An active radar augmentor as in claim 14 wherein said receive antenna and said transmit antenna are each microstrip antenna arrays of radiating elements including feed networks.

16. An active radar augmentor as in claim 14 wherein said RF absorbing means comprises high-loss silicone rubber material loaded with carbon particles which operates to absorb incident microwave energy.

* * * * *